March 23, 1943. J. P. RATIGAN 2,314,630
WIRE LINE GRIP
Filed Aug. 30, 1941

JAMES P. RATIGAN,
INVENTOR

BY
*Harold W. Mattingly*
ATTORNEY.

Patented Mar. 23, 1943

2,314,630

UNITED STATES PATENT OFFICE 2,314,630

WIRE LINE GRIP

James P. Ratigan, Los Angeles, Calif.

Application August 30, 1941, Serial No. 409,109

6 Claims. (Cl. 24—243)

My invention relates to a wire line grip and has particular reference to a wire line grip of ring or eye form particularly adapted to provide a pivotal connection between a cable and a trunnion and finding particular utility when employed to connect the horsehead sling to the trunnions of the carrier bar in oil well pumping installations.

Heretofore it has been common practice in oil well pumping installations to employ an eye member having a tapered cable socket into which the end of the cable was placed, flared outwardly, and the socket then filled with molten lead or babbitt to secure the cable to the eye, necessitating the use of heating apparatus immediately adjacent the well with many disadvantages and dangers attendant thereto.

To eliminate these disadvantages, it has been suggested to employ a wire line grip having a body member including a ring or eye and having a cable receiving groove or recess therein to receive a portion only of the diameter of the cable and then to employ a clamp or grip member having a corresponding cable receiving groove or recess to be drawn against and clamped upon the body member by means of hinges, bolts or other fastenings to grip the cable in clamped relation within the adjacent recesses of the body and clamp members.

However, such clamps have had the disadvantages that in order to provide space for the manipulation of the clamping screws or bolts, the eye was required to be formed in one only of the members and out of direct alignment with the axis of the cable, placing undue and undesirable strains upon the metal of which the clamping body was formed.

It is therefore an object of my invention to provide a wire line grip in which two substantially identical complementary members are employed, each of which is provided with a cable receiving recess and with one-half of an eye member so arranged that when the two complementary members are placed face to face and secured together by suitable bolts the cable will be securely clamped in the meeting recesses of the two members while the two halves of the eye portions of the two members will form together a complete eye for receiving a trunnion or other device to which the cable is to be connected.

Another object of my invention is to provide a device of the character described in which ample space may be provided for the reception of the clamping bolts without requiring the disposition of the eye out of or offset from direct alignment with the axis of the cable.

Another object of my invention is to provide a device of the character described wherein the lower or eye forming portions of the grip members are securely held together by means of a bolt or screw extending through the two assembled members below or beyond the eye opening formed by them to thus prevent spreading of the eye forming portions of the grip under extreme loads.

It is additionally an object of my invention to provide an apparatus of the character set forth hereinbefore which includes separable halves secured to each other by clamping bolts, each half defining in adjacently disposed faces a channel of arcuate cross section for receiving the end of a cable, and in which coacting radial ridges are provided in each channel to define a tortuous cable receiving channel and for engaging and clamping the cable.

Other objects and advantages of my invention will be apparent from a study of the following specifications, read in connection with the accompanying drawing, wherein.

Figure 1:
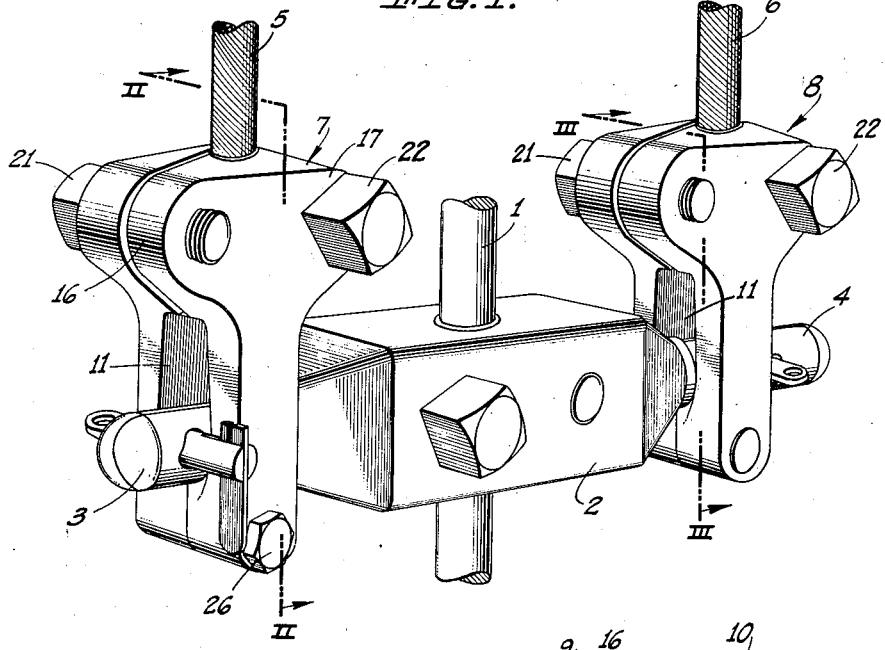
Fig. 1 is a perspective view illustrating the appearance and construction of the preferred embodiment of my invention and the manner in which the same is employed for effecting a connection between the horsehead sling cables and the carrier bar employed in oil well pumping installations.

Referring to the drawing, I have illustrated in Fig. 1 a portion of a typical oil well pump installation which includes a polished rod, a fragment of which is identified by the reference character 1 in Fig. 1. This polished rod forms the uppermost member of a string of sucker rods which are extended from the ground surface to a reciprocating pump located deep within the well bore. The polished rod 1 and the sucker rod string attached thereto is employed for the purpose of imparting a reciprocating motion to the pump plunger and the surface pumping equipment ordinarily includes an oscillating walking beam which, by means of a horsehead and accessories, is connected to the polished rod 1 to reciprocate the polished rod as the walking beam oscillates.

These connection accessories ordinarily include a carrier bar 2 which is securely clamped to the polished rod 1 and which provides a pair of laterally extending trunnions 3 and 4 to which horsehead sling cables 5 and 6 are pivotally connected. The carrier bar 2 may be of any conventional construction, although the form shown in Fig. 1 comprises an improved type of carrier bar which, however, forms no part of the present invention but constitutes the subject-matter of my copending application Serial No. 411,043 filed September 16, 1941 and entitled Clamp type carrier bar.

The present invention is directed to a wire line grip, two of which are illustrated in Fig. 1 and identified by reference characters 7 and 8, respectively, these grips being employed for the purpose of effecting a pivotal connection between the sling cables 5 and 6 and the trunnions 3 and 4.

The grips 7 and 8 each preferably comprises a pair of complementary members 9 and 10 adapted when assembled to provide a substantially eye form which is characterized by having a trunnion receiving opening 11 extended therethrough. The members 9 and 10 are separable along a plane which includes the axis of the opening 11, this plane being defined by upper meeting faces 12 and 13 and lower meeting faces 14 and 15.

The upper portions of the members 9 and 10 are preferably enlarged laterally of the axis of the opening 11 so as to give each member a substantially T-shaped form which is clearly illustrated in Fig. 1, this lateral enlargement of the members 9 and 10 serving to define clamping lugs 16 and 17 which are best illustrated in Fig. 1.

The meeting faces 12 and 13 are provided with longitudinally extending grooves 18 and 19. These grooves are extended axially of the members 9 and 10 and transversely of the axis of the opening 11 and are so located as to define a channel for receiving a cable when the members 9 and 10 are assembled as illustrated in the drawing.

Figure 2:
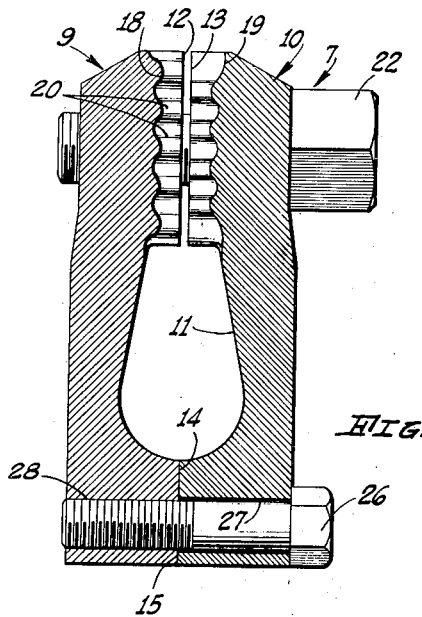
Fig. 2 is a cross sectional view taken substantially along the line II—II of Fig. 1.

Each of the grooves 18 and 19 are provided with a plurality of circumferentially extending ridges 20 which extend radially inwards of the channel defined by these grooves. The ridges 20 are spaced axially of each other along the grooves and are preferably formed with a smoothly curved cross section as is illustrated in Fig. 2. Furthermore, the ridges 20 which are formed on the member 10 are so located as to lie opposite the spaces between adjacent ridges 20 formed on the member 9 when the members are assembled. The ridges 20 thus coact to form a tortuous cable receiving channel and the ridges 20 serve to engage the sides of the cables 5 or 6 and permit the cables to be distorted to conform to the tortuous channel in which they are received, thus providing a high frictional engagement between the members 9 and 10 and the cables to prevent the cables from slipping axially of the channel which is defined by the grooves 18 and 19.

This frictional engagement between the members 9 and 10 and the cable is obtained by employing clamping bolts 21 and 22 which are passed through the clamping lug portions 16 and 17 of each of the members 9 and 10.

Figure 3:
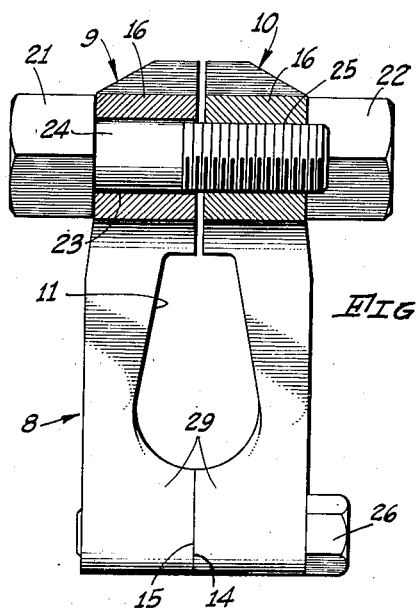
Fig. 3 is also a cross sectional view taken substantially along the line III—III of Fig. 1.

As is illustrated in Fig. 3, the lug portions 16 of one of the members is provided with a clearance opening 23 adapted to freely pass the shank portion 24 of the bolt 21, whereas, the other of the lug members 16 is provided with a threaded opening 25 aligned with the opening 23 and adapted to threadedly engage the threads which are formed on the shank 24.

Preferably the lugs 16 and 17 of each of the members is provided with one clearance hole 23 and one threaded hole 25, thus permitting the bolts 21 and 22 to be inserted from opposite directions as is illustrated in Fig. 1. By adopting this form of construction, I am permitted to space the bolts 21 and 22 closely adjacent the grooves 18 and 19 without incurring the difficulties which would arise if both of the bolt heads were placed on the same side of the device and resulting from one of the bolt heads interfering with the use of a wrench on the other bolt head. The bolts 21 and 22 are employed to draw the members 9 and 10 toward each other to thereby securely clamp the cables 5 or 6 in the channel defined by the grooves 18 and 19 and between the ridges 20.

Axial alignment of the members 9 and 10 may be maintained by providing an auxiliary clamping and guiding bolt 26 which is passed through a clearance hole 27 formed in one of the members and threadedly engaged with a threaded aperture 28 formed in the other of the members, the bolt 26 interengaging the members at the location of the lower meeting faces 14 and 15.

In applying the device to a cable, the bolts 21, 22 and 26 are loosened sufficiently to permit the parts 9 and 10 to be separated a sufficient distance to permit the cable 5 or 6 to be inserted within the cable receiving channel. The bolt 26 although loosened is preferably left in threaded engagement with the member 9 so that as the bolts 21 and 22 are tightened to clamp the cable in its channel, the bolt 26 will serve to guide the members in their movement toward each other and to maintain the device aligned until the full desired clamping pressure is applied. This clamping pressure may then be augmented by tightening the bolt 26.

When the device is to be used for connecting cables to trunnions, as is illustrated by way of example in Fig. 1, the lower portions of the members 9 and 10 are preferably provided with a rounded contour such as that illustrated at 29 in Fig. 3. This may be accomplished by forming those parts of the members 9 and 10 which terminate in the meeting faces 14 and 15 with a substantially cylindrical cross section imparting to the faces 14 and 15 a circular form. This permits the wire line grips 7 and 8 to rock about an axis which is extended parallel to the guiding bolt 26 and permits the device to accommodate for slight misalignments in the apparatus to which it is connected.

From the foregoing it will be apparent that I have provided a wire line grip which is relatively inexpensive to manufacture by reason of the substantial identity in design and shape of the two complementary members employed and in which a more positive and secure grip may be obtained upon the cable by employing the radially extending ridges in the cable receiving channels or recesses by which the cable when gripped is forced into a tortuous path, insuring substantially uniform gripping of the cable over the entire length of that part of the cable received in the channels.

It will also be noted that by employing the bolt 26 below the eye opening formed by the two members 9 and 10, the effective width of the cable receiving channel may be readily adjusted to conform with the diameter of the cable with which it is used while still maintaining substantial parallelism between the two meeting faces of the recesses or channels to thereby insure substantially uniform gripping of the cable throughout the length of the channel while at the same time the bolt 26 will hold the lower ends of the members 9 and 10 from spreading apart under extreme loads placed upon the grip and thus avoiding any possibility of spreading or opening up of any portion of the cable gripping channel.

Actual tests of my cable grip have demonstrated that with the use of but only two 1⅛th inch bolts 21 and 22, the device may be gripped upon a 1 inch wire line cable without slipping or damaging the cable even when placed under a capacity load of 36,000 pounds.

While I have shown and described the preferred embodiment of my invention, I do not desire to be limited to any of the details of construction shown or described therein, except as defined in the appended claims.

I claim:

1. In a wire line grip, a pair of complementary members which when assembled together define an eye member having a trunnion receiving opening therethrough, said members each having meeting faces disposed on opposite sides of said opening and in a plane including the axis of said opening, said members being enlarged at one side to define meeting faces at said one side of greater extent than the meeting faces at the other side, said members each having a groove of arcuate cross section formed in said greater meeting faces and extended into said opening to define a cable receiving channel when said members are assembled together, said members having a plurality of spaced ridges of a smoothly curved cross section extending circumferentially of and radially inwards of said grooves, the ridges on one of said members being so disposed as to lie opposite the spaces between adjacent ridges on the other of said members when said members are assembled together, a pair of bolts threadedly interengaging said members at said one side of said opening, said bolts being disposed on opposite sides of said grooves, and another bolt threadedly interengaging said members at the other side of said opening.

2. In a wire line grip, a member having a tortuous cable receiving channel formed therein and having a trunnion receiving opening formed therethrough transversely and intersecting said channel, said member being formed of complementary halves separable along a plane extending lengthwise of said channel and defining one pair of meeting faces disposed on the opposite side of said opening from said channel, said meeting faces each comprising an area of substantially circular form, screw means for drawing said halves together to clamp a cable placed in said channel, and a guiding and auxiliary clamping bolt extended between said halves through said meeting faces and threadedly interengaging said halves for holding said halves in alignment as they are drawn together.

3. In a wire line grip, a member having a cable receiving channel formed therein and having a trunnion receiving opening formed therethrough transversely of and intersecting said channel, said member being formed of complementary halves separable along a plane extending lengthwise of said channel and defining one pair of meeting faces disposed on the opposite side of said opening from said channel, said meeting faces each comprising an area of substantially circular form, screw means for drawing said halves together to clamp a cable placed in said channel, and guiding means extending between said halves through said meeting faces for holding said halves in alignment as they are drawn together.

4. A wire line grip comprising a pair of headed clamping bolts; and two substantially identical members each having on one face thereof a cable receiving channel and a recess disposed between the channel and the end of the member, each of said members being provided with a pair of bores disposed on opposite sides of said channel and extending through said member from said one face thereof, one of the bores of each of said pairs of bores being internally threaded to threadedly receive one of said clamping bolts and the other bore of each of said pairs of bores having a diameter sufficient to freely pass the other of said clamping bolts, whereby said members may be placed adjacent each other with said faces in meeting relation to define a trunnion receiving eye at the juxtaposed recesses and whereby said clamping bolts may be inserted from opposite sides to inter-engage said members and clamp a cable in said channels between said members.

5. In a wire line grip construction, a grip member having on one face thereof a cable receiving groove and having a channel formed in said one face between said groove and one end of said member and extending across the full width of said member, said member also being provided with a pair of bores disposed on opposite sides of said groove and away from said channel extending through said member from said one face thereof, one of said bores being internally threaded to provide for a threaded engagement with a clamping bolt, and the other of said bores having a diameter somewhat greater than the diameter of said one bore to permit a clamping bolt to be freely passed therethrough, whereby two of said members may be placed face to face to define a trunnion receiving eye at the juxtaposed channels and inter-engaged by clamping bolts passed through said members from opposite sides thereof to grip between said members a cable placed in said grooves.

6. In a wire line grip, a pair of complementary members which when assembled together define an eye member having a trunnion receiving opening therethrough, said members each having meeting faces disposed on opposite sides of said opening and in a plane including the axis of said opening, said members being enlarged at one side to define meeting faces at said one side of greater extent than the meeting faces at the other side, said members each having a groove of arcuate cross section formed in said greater meeting faces and extended into said opening to define a cable receiving channel when said members are assembled together, a pair of bolts threadedly interengaging said members at said one side of said opening, said bolts being disposed on opposite sides of said grooves, and another bolt threadedly interengaging said members at the other side of said opening.

JAMES P. RATIGAN.